United States Patent [19]
Batchelor

[11] Patent Number: 5,439,339
[45] Date of Patent: Aug. 8, 1995

[54] EXTERNALLY THREADED INTERFERENCE FIT FASTENER WITH OPPOSITELY THREADED PULLER

[75] Inventor: John S. Batchelor, Rugby, England

[73] Assignee: Hi-Shear Corporation, Torrance, Calif.

[21] Appl. No.: 160,049

[22] Filed: Dec. 1, 1993

[51] Int. Cl.6 .................. F16B 23/00; F16B 35/06
[52] U.S. Cl. .................. 411/407; 411/410; 411/361
[58] Field of Search ............ 411/403, 407, 410, 361, 411/43, 263

[56] References Cited

U.S. PATENT DOCUMENTS

| | | | |
|---|---|---|---|
| 439,279 | 10/1890 | Kramer | 411/263 |
| 932,395 | 8/1909 | Kenney | 411/263 X |
| 5,098,238 | 3/1992 | Batchelor et al. | 411/361 |

Primary Examiner—Neill R. Wilson
Attorney, Agent, or Firm—Donald D. Mon

[57] ABSTRACT

An interference fit fastener and threaded puller attachment in combination. The fastener has a shank with an external thread and an axial recess with an internal thread, the threads being of opposite hands. The puller attachment is threadly engaged to the internal thread so as to exert an axial pull on the fastener, and to resist torque exerted on a nut or collar being applied to the external thread. After the fastener is set, the puller is removed.

2 Claims, 1 Drawing Sheet

U.S. Patent         Aug. 8, 1995         5,439,339

EXTERNALLY THREADED INTERFERENCE FIT FASTENER WITH OPPOSITELY THREADED PULLER

FIELD OF THE INVENTION

An interference fit threaded fastener with a threaded pulling attachment threaded to it, the threads being of opposite hand.

BACKGROUND OF THE INVENTION

Externally threaded fastener pins are widely used in aircraft and aerospace structures. The pins have a head, a shank, and an external thread on the shank. The pins are pulled into holes in the structure so the head bears against the structure, and the thread projects beyond it. Then a threaded fastener is turned on to the threads and tightened down to a correct torque level.

Substantial force must be expected to be required to seat a properly dimensioned fastener with an interference in a properly dimensioned hole in the workpiece. In modern practice, percussive blows on the head of the fastener to seat the fastener are not acceptable. Instead a strong pull on the shank is required.

There are various means known to accommodate a pulling device. Obviously the thread on the fastener itself is not available for the purpose because it will fit too closely in the hole as it passes through it. Various extensions of the shank have been suggested. One kind is integral with the shank and must be broken or cut off. While this is useful for some sizes of fasteners and kinds of installations, it has the disadvantage of being formed from the same blank as the remainder of the fastener, and of the same material. This complicates the manufacture, and when the material is costly, is inherently wasteful. It has the additional disadvantage that in order to accommodate a very thick workpiece and a substantial tool, the extension would have to be much too long.

These disadvantages have been recognized, and in U.S. Pat. No. 5,098,238 issued Mar. 24, 1992 to Batchelor et al, a puller is shown threaded into an internally threaded recess in the threaded end. This enables the puller to be removed without cutting and wasting material. It can be re-used as part of a pulling tool instead of as a wasted part of the fastener, and can be made with very strong threads.

While the Batchelor device generally performs well, there are certain circumstances for which improvement is indicated. When a fastener is pulled into a hole and makes an optimum interference fit, the torque exerted on the nut or collar when tightened will be fully resisted by the fastener. However, occasionally even within proper tolerances, the interference fit is not that tight, and some kind of restraint is needed. This is a particular problem if the head is not accessible, or is not provided with wrench-engaging means.

It is an object of this invention to provide a removable puller which can also resist rotation of the pin while the collar or nut is tightened, without complicating the structure of the fastener or of the tool used to set the fastener.

BRIEF DESCRIPTION OF THE INVENTION

A puller according to this invention is used in combination with a fastener pin to be set by torque forces after having been pulled into a hole in a workpiece to form an interference fit in the hole. The fastener pin has a central axis, a head, a cylindrical shank, a thread on its unheaded end, and a recess centered on the axis opening onto the unheaded end of the pin.

According to this invention, the external thread on the fastener pin is of one hand, and the recess has an internal thread of the opposite hand. Accordingly, with the pin fully threaded into the recess, it can exert a counter-torque on the pin in opposition to a torque exerted on the collar or nut.

The puller thereby provides means both to pull the pin into the hole and seat the head against the workpiece, and also to exert a restraint on the pin should it be required. Depending on the installation, different pullers may be used for pulling and for torque resistance. Usually the thread on the fastener pin will be right-hand, and the thread in the recess will be left-hand.

The above and other features of this invention will be fully understood from the following detailed description and the accompanying drawings in which:

DETAILED DESCRIPTION OF THE INVENTION

Figure 1:
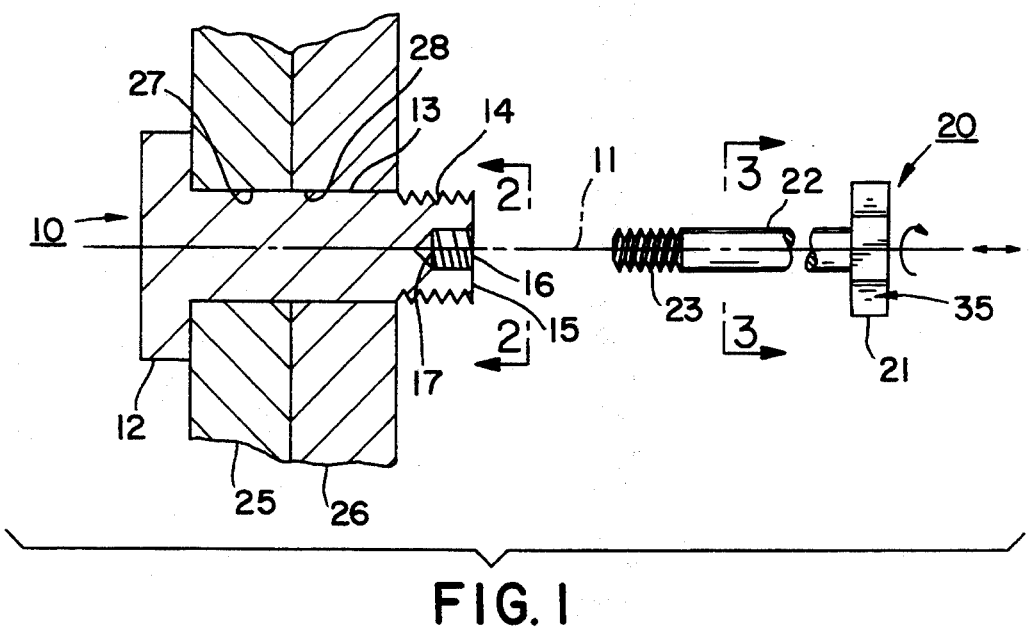
FIG. 1 is an axial cross-section of a fastener pin and of a puller according to this invention.
Figure 2:
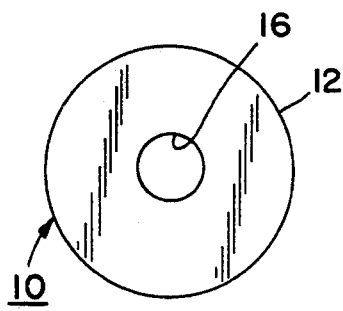
FIG. 2 is a cross-section taken at line 2—2 in FIG.
Figure 3:
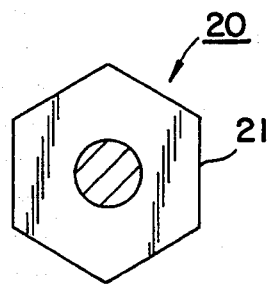
FIG. 3 is a cross-section taken at line 3—3 in FIG. 1.
Figure 4:
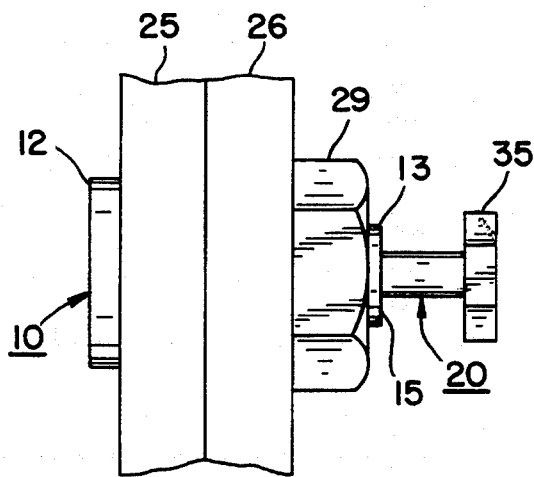
FIG. 4 is a side view of an installed fastener, with the puller still engaged.

FIG. 1 shows a fastener pin 10 having a central axis 11, a head 12, a cylindrical shank 13, an external thread 14 adjacent to its unheaded end 15, and a recess 16 in the unheaded end, with an internal thread 17.

A puller 20 has a wrench-engaging head 21, a shank 22, and an external thread 23. Internal thread 17 and external thread 23 are mating threads of the same, first, hand. External thread 14 on the pin is of the opposite, second hand. Thread 14 is proportioned to receive a collar or nut 29 to be tightened onto the fastener pin to join workpieces 25, 26 together by passing through holes 27, 28 in them, with the head bearing against one of them.

The pin is first inserted as far as it can be without strong or percussive forces. Then the puller is threaded into the recess. Its shank can be made as long as necessary to reach the internal thread and be threaded into it. Then the head of the puller is grasped by a pulling tool, usually hydraulically powered, and in opposition to one of the workpieces is pulled to draw the fastener pin into the workpieces until the head is seated. The puller is unthreaded and removed because it will often be too long in case the interference fit is not tight enough to hold the pin against rotation when the nut is tightened, and a counter-rotative wrench must be applied. Also the interference fit may be tight enough that no restraint by the puller will be needed in order to torque down the nut. For this additional reason wit will be removed.

However, if the fit is not tight enough, the puller, usually a shorter one, will be threaded into the recess, and restrained in the opposite direction from the collar or nut while the collar or nut is tightened down to the correct torque by a tool. The opposite hands of the threads enables this result. Thereafter, the puller and the tool will be removed and the fastener is fully set. The wrench engaging means 35 on the puller is schematically shown as a hex head. More frequently, it will instead be detents for engagement by the head of a tool. Tools which restrain one element of a fastener combination and rotate the other are well-known. So are puller tools which exert only axial forces. With this invention, ordinary torque wrenches can be used except when counter-rotative action is required. At that time a tool must be used which restrains the pin against rotation by holding the puller.

While the reversal of the hand of one of the threads relative to the other may appear to be a relatively small change from the known art, its results are quite important, and can save considerable rework of parts, because it enables the correct torquing of interference fasteners whose restraint is insufficient, using the same means for enabling the axial pull to seat the fastener. It is a surprising and surprisingly important tooling concept.

This invention is not to be limited by the embodiment shown in the drawings and described in the description which is given by way of example and not of limitation but only in accordance with the scope of the appended claims.

I claim:

1. In combination: a fastener pin having a head, a shank, an unheaded end, an external thread adjacent to said unheaded end, a recess opening onto said unheaded end, and an internal thread in said recess, said internal thread being of a first hand, and said external thread being of a second, opposite, hand; and a puller comprising wrench-engaging means adapted for pulling and rotation, a shank, and an external thread on said shank of said first hand, dimensioned to mate with said internal thread in said recess, whereby with the puller threaded into the recess, an axial force can be exerted by it to pull the pin into a hole in a workpiece, and a torque can be exerted on said puller in opposition to torque exerted on a collar or nut threaded to the external thread, whereby to prevent the pin from freely rotating in the hole while the collar or nut is being torqued, said puller having no other connection of any kind with said fastener pin, said collar or nut, or with any object threadedly connected with said fastener pin or said collar or nut.

2. A combination according to claim 1 in which said first hand is left, and said second hand is right.

* * * * *